United States Patent [19]

Ciniglio

[11] Patent Number: 4,700,878
[45] Date of Patent: Oct. 20, 1987

[54] SOLDERING APPARATUS

[75] Inventor: Alexander J. Ciniglio, Brentwood, England

[73] Assignee: Dolphin Machinery Limited, England

[21] Appl. No.: 893,980

[22] Filed: Aug. 7, 1986

[30] Foreign Application Priority Data

Aug. 9, 1985 [GB] United Kingdom ............... 8520013
Dec. 10, 1985 [GB] United Kingdom ............... 8530346

[51] Int. Cl.$^4$ .............................................. B23K 1/08
[52] U.S. Cl. ................................. 228/37; 415/170 A
[58] Field of Search ............... 228/37, 260; 417/430; 415/170 A; 277/152

[56] References Cited

U.S. PATENT DOCUMENTS

| | | | |
|---|---|---|---|
| 4,011,980 | 3/1977 | Dvorak et al. | 228/180.1 |
| 4,131,285 | 12/1978 | Denton | 277/152 |
| 4,337,956 | 7/1982 | Hopper | 277/152 |
| 4,447,001 | 5/1984 | Allen et al. | 228/37 |
| 4,587,076 | 5/1986 | Bonhomme | 415/170 |

FOREIGN PATENT DOCUMENTS 0139455 2/1985 European Pat. Off.

Primary Examiner—Nicholas P. Godici
Assistant Examiner—Karen Skillman
Attorney, Agent, or Firm—Wigman & Cohen

[57] ABSTRACT

In a soldering apparatus a pump pumps molten solder up into a tube to form a head of molten solder. Solder is fed from the tube through a conduit to a nozzle for a soldering operation. The pump comprises a rotatable shaft extending within the tube and an air tight seal is formed between the shaft and tube, above the level of the solder, to reduce the formation of dust of oxidized solder at the region of shear between the shaft and the solder surface.

5 Claims, 3 Drawing Figures

SOLDERING APPARATUS

INTRODUCTION AND BACKGROUND

The present invention relates to soldering apparatus.

Such apparatus typically comprises a bath of molten solder from which solder is pumped through a nozzle to form a stream or wave of solder through which components to be soldered or tinned are passed, or into which they are dipped.

A skin of oxidized solder will form on the exposed upper surface of the molten solder and this needs to be cleaned off at intervals.

Such soldering apparatus may also comprise a pump or stirrer having a rotating shaft which passes through the surface of the solder bath. It has been found that a fine dust, believed to be oxidized solder, tends to accumulate on the surface adjacent the rotating shaft, probably due to shear at the surface. This dust may become airborne, and so represents a potential hazard to operatives when the machine is being cleaned.

It has been found that dispersal of this dust may be controlled by surrounding the rotating shaft with a stationary cylinder or tube where it passes through the solder surface. However, a large amount of dust still accumulates inside the tube and needs to be cleaned away periodically.

SUMMARY OF THE INVENTION

The present invention provides soldering apparatus wherein a rotatable shaft which penetrates the surface of the molten solder is surrounded by a substantially stationary tube which also penetrates the solder surface, in which a substantially airtight seal is provided between the tube and the shaft above the solder surface.

It has been found that by incorporating an airtight seal between the shaft and the tube above the solder surface, the formation of toxic dust is substantially reduced or almost eliminated. The seal may be formed by a high temperature grease-packed bearing, but as an alternative, a high temperature polytetrafluoroethylene or other plastics seal may be used. In particular, a single or double lip seal, with the lip(s) formed of polytetrafluorethylene or other plastics material, may be utilised to seal against the rotatable shaft.

The invention is particularly applicable to solder pumps.

EP-A-0139455 describes a soldering apparatus in which solder is pumped through a nozzle or applicator. The system uses a pump which comprises a propellor-like impellor having two blades for pumping the solder upwardly from a chamber in a solder bath, through the nozzle, which is moved vertically to perform a soldering operation.

It has been found that in such a construction, the flow of solder may pulsate undesirably. This is considered to be due to the difficulty in manufacturing and driving the pump to sufficiently close tolerances.

In accordance with another aspect of the invention there is provided soldering apparatus comprising a bath for solder, a nozzle, and a pump for pumping solder from the bath through the nozzle, wherein the pump comprises a tube extending through the surface of the solder bath, a rotatable blade mounted at the bottom of the tube for pumping solder up the tube and an outlet above the blade, the outlet being connected to a conduit for feeding solder from the tube to the nozzle.

Preferably the blade is mounted on a generally upright shaft which is housed in the tube, an airtight seal being formed between the shaft and tube at an upper end thereof.

Very preferably a baffle is provided in the tube above the outlet aperture. The baffle may be attached to an inner wall of the tube or, preferably, to the shaft. Preferably the baffle is located below the normal operating height of the solder in the tube. The baffle forms a barrier to solder being pumped up the tube. Hence if the pump speed is increased to increase or pulse the flow of solder through the nozzle, or the flow fluctuates for some other reason such as a momentary blockage, the baffle will limit the rise of solder up the tube, thus allowing greater pump speeds and pressures whilst protecting any bearings or seals at the top of the tube. Hence whilst the tube may act as a constant head device, there is also an action pumping the solder through the nozzle.

Preferably the blade is a screw blade, extending 360° or more around the shaft, preferably for two revolutions, 720°. Advantageously, the blade is a close fit in the tube, to a tolerance of a few thousandths of an inch (0.025 mm) in 30 mm.

Preferably, a lower end of the tube remains immersed in the solder bath, the solder covering at least a lower part of the blade, and preferably all of it.

In operation, solder is pumped through a nozzle, by pumping the solder up into the tube to form a constant head device, and feeding solder from the tube, at a fixed level in the tube, through a conduit to the nozzle. The flow of solder through the nozzle may then be kept substantially constant even if the nozzle and tube are moved vertically, the head of solder relative to the nozzle remaining substantially constant.

Preferably a valve is provided between the pump and the nozzle to control the flow of solder through the nozzle while maintaining a constant pump speed. Preferably the valve operates by allowing pumped solder to escape into the solder bath, preferably below the surface thereof.

DESCRIPTION OF PREFERRED EMBODIMENT

Figure 1:
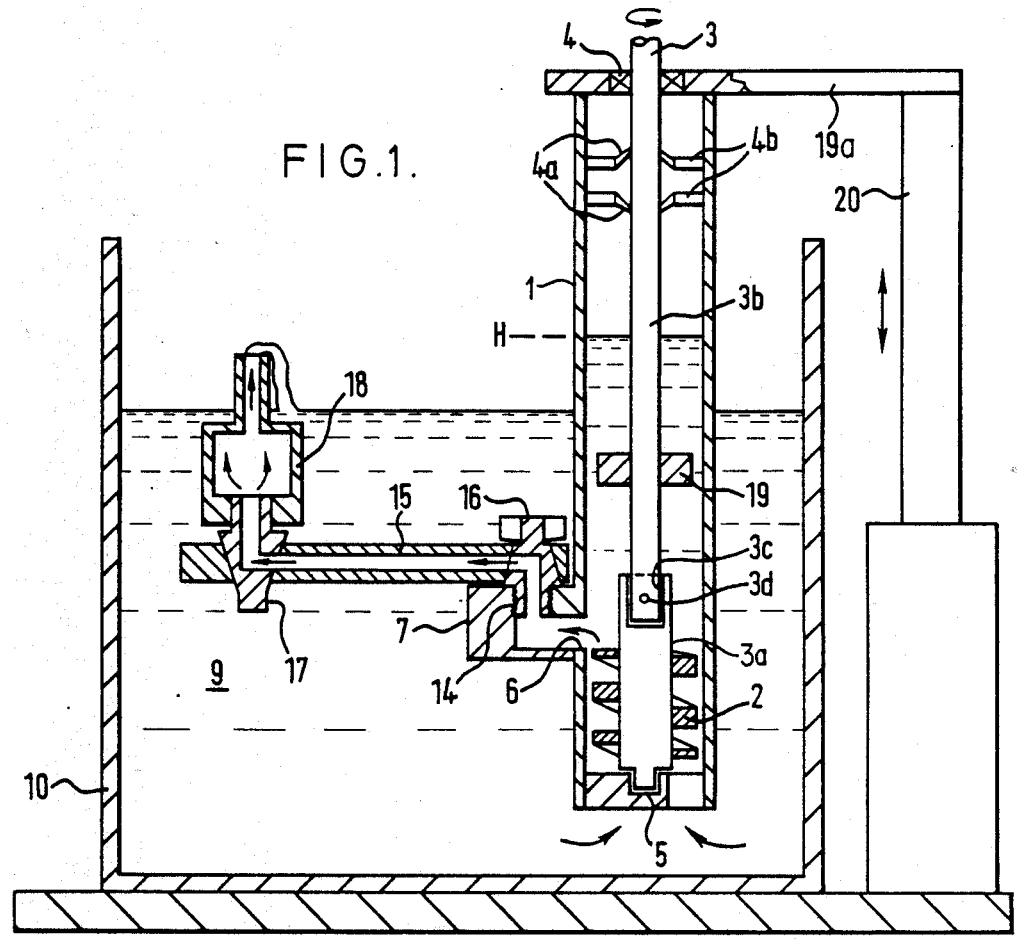
FIG. 1 is a cross-section through a soldering apparatus according to the invention.

FIG. 1 of the drawings shows a first embodiment of the invention having a circular cross-section tube 1 housing a blade 2 mounted on a driven shaft 3. The lower end of the tube 1 is immersed in a molten solder 9 contained in a bath 10.

The shaft 3 is in two parts, a lower part 3a carrying the blade 2 and a upper part 3b. The lower shaft part 3a carries a socket 3c for the upper part 3b and is attached thereto by a lockscrew 3d.

The shaft 3 is mounted in bearings 4, 5 at the top and bottom of the tube. Upper bearing 4 is a high temperature grease-packed ball bearing which forms a partially airtight seal to minimise oxidation of the solder within the tube 1. The seal provided by the bearing 4 alone may not be sufficient to keep oxidation to an acceptable level, and therefore two oppositely facing lip seals 4a mounted in collars 4b are also provided. More than two seals, for example 4, may be provided to enhance the effective lifetime of the sealing arrangement. A plain lower bearing 5 supports the shaft 3 and is apertured or spider-mounted to allow solder to flow into the tube 1.

The blade 2 is a helical, screw blade and extends for 720° around the shaft beginning and ending in a sharp edge to penetrate the solder and deliver it cleanly at the top of the blade. The blade 2 is a close fit in the tube 1.

An aperture 6 is formed in the side of the tube 1 just at and above the top edge of the blade 2. The aperture connects with a socket or union 7 welded to the tube for receiving a conduit 15 to deliver solder to a nozzle.

Union 7 has a vertical threaded aperture 14 connected to a conduit or bore 15 which is contiguous with side aperture 6. Conduit 15 is swivably mounted on the union 7 by means of a tapering boss which is screwed into aperture 14. A similar boss 17, but relatively upside down, is mounted at the other end of the conduit 15 and connected to a nozzle 18. Such an arrangement is described in EP-0139455. Nozzle 18 may have an elongate aperture for forming a wave or side stream of solder, or a single or a plurality of tubes forming small streams for soldering difficult access terminals.

A circular baffle 19 is welded to the shaft 3. The baffle is located below the normal operating height M of the solder in the tube 1.

Shaft 3 is rotated by an electric motor using a chain and sprocket arrangement as is known in the art. The motor is mounted on a plate 19a which supports cylinder 1, and hence the conduit and nozzle 15,18.

Plate 19a is supported by a vertical beam 20 which is raised and lowered by a rack and pinion arrangement (not shown) as is known in the art.

The shaft 3 is rotated at a constant speed to produce a head of solder in the tube 1 above the aperture 6. The head relative to the nozzle 18 may thus be maintained substantially constant, even with vertical movement of the lower end of the tube 1 relative to the solder bath as beam 20 is moved to raise the nozzle 18 during a soldering operation, at least the lower end of the tube remaining below the surface of the solder bath.

Figure 2:
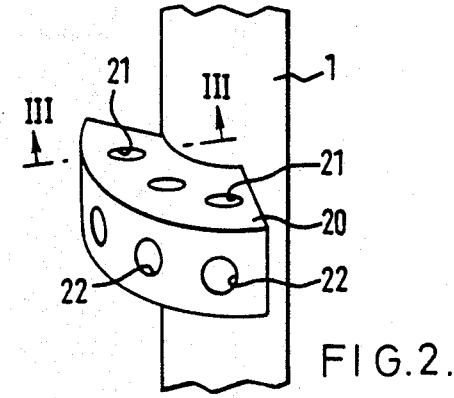
FIG. 2 is a perspective view illustrating a modification of the embodiment of FIG. 1.

Union 7 may comprise a plate like member 20 (FIG. 2) which extends around the tube 1 and has several outlets for connection to conduits 15. Outlets not in use are plugged. Nozzles 18 may be attached directly to the union 7 if desired.

Figure 3:
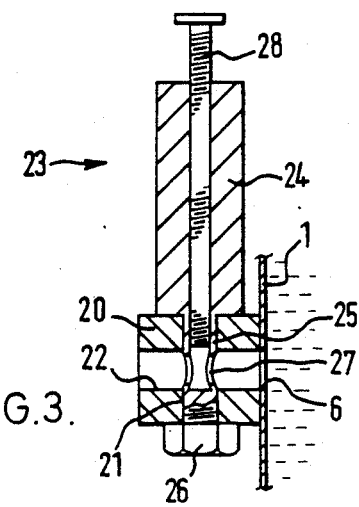
FIG. 3 is a cross-section along the line III—III of FIG. 2 showing a valve in position.

Plate 20 may be welded to the tube 1, or cast integrally with the tube, and vertical and radial apertures 21,22 drilled through the plate and adjacent tube wall (see FIG. 3). Those apertures not in use may be plugged, or covered by welded-on plates. This arrangement also allows a conduit to be mounted below the plate to reduce the required height between the bottom of the tube and the top of the nozzle 18.

FIG. 3 shows a valve arrangement 23 which may be positioned in aperture 21, controlling the flow of solder through the corresponding aperture 22. Preferably the valve is used in one such port and a conduit 15 connected to another port, hence the valve 23 allows pumped solder to escape into the bath, below the surface, to control the rate of flow of solder through the nozzle 18.

Valve 23 comprises an internally threaded cylinder 24, of reduced diameter at its lower end 25 which is received in and projects through aperture 21. The bottom portion of lower end 25 is threaded and a nut 26 secures the valve on the plate 20. Bottom portion 25 has a through aperture 27 which is aligned with aperture 21. A threaded stud 28 is screwed into cylinder 24 and is screwed up or down to open or close the aperture 27, to decrease or increase the flow of solder through the conduit 15 to nozzle 18.

It will be apparent that the invention is applicable to soldering apparatus in which the nozzle and/or pump are held stationary.

Various modifications may be made within the scope of the invention, as set forth in the appended claims.

What I claim is:

1. A soldering apparatus comprising:
   a solder bath for holding a supply of molten solder;
   an applicator for applying molten solder to a workpiece; and
   support means holding the applicator in the solder bath and including conduit means to conduct solder from the solder bath into the applicator, and pump means to pump solder from the solder bath through the conduit means and towards the applicator, in which the pump means is mounted at the bottom of a tube, the conduit is connected intermediate the length of the tube arranged such that a head of solder forms above the conduit in the tube to drive solder along the conduit to exit at the applicator, and at least one air seal disposed at the top of the tube to prevent air entering air space above the solder in the tube.

2. A soldering apparatus according to claim 1, in which the pump means comprises a screw bladed impeller mounted on a shaft which extends through the tube.

3. A soldering apparatus according to claim 1, including valve means coupled to an aperture in the tube to bleed off solder and reduce the flow of solder to the applicator.

4. A soldering apparatus according to claim 1, including a baffle positioned in the tube above the conduit.

5. A soldering apparatus according to claim 1, including means connected to the support means to move the support means, and thereby the applicator, the pump means, and the conduit means relative to the solder bath vertically towards and away from a workpiece.

* * * * *